United States Patent
Ogiwara et al.

(10) Patent No.: US 7,079,313 B2
(45) Date of Patent: Jul. 18, 2006

(54) OPTICAL AMPLIFYING APPARATUS WHICH ROUTES PUMPING LIGHT TO A RAMAN AMPLIFICATION MEDIUM AND A RARE-EARTH-DOPED OPTICAL AMPLIFICATION MEDIUM

(75) Inventors: Hiroshi Ogiwara, Kawasaki (JP); Kenji Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 10/698,472

(22) Filed: Nov. 3, 2003

(65) Prior Publication Data
US 2004/0091003 A1 May 13, 2004

(30) Foreign Application Priority Data
Nov. 5, 2002 (JP) ............................. 2002-321075

(51) Int. Cl.
*H04B 10/12* (2006.01)
(52) U.S. Cl. .............................. 359/341.32; 359/337.4; 359/334
(58) Field of Classification Search ............. 359/337.4, 359/334, 341.32
See application file for complete search history.

(56) References Cited

U.S. PATENT DOCUMENTS

| | | | |
|---|---|---|---|
| 6,310,716 B1 * | 10/2001 | Evans et al. ................. 359/334 |
| 6,388,801 B1 * | 5/2002 | Sugaya et al. .............. 359/334 |
| 6,429,966 B1 * | 8/2002 | Hazell et al. ........... 359/341.41 |
| 6,437,906 B1 * | 8/2002 | Di Pasquale et al. .... 359/337.2 |
| 6,466,362 B1 * | 10/2002 | Friedrich ..................... 359/334 |
| 6,466,363 B1 * | 10/2002 | Masum-Thomas et al. . 359/334 |
| 6,504,973 B1 * | 1/2003 | DiGiovanni et al. .......... 385/27 |
| 6,510,000 B1 * | 1/2003 | Onaka et al. ............... 359/334 |
| 6,549,329 B1 * | 4/2003 | Vail et al. .................... 359/334 |
| 6,563,629 B1 * | 5/2003 | Ghera et al. ............. 359/337.1 |
| 6,628,454 B1 * | 9/2003 | Ghislotti et al. ............. 359/340 |
| 6,631,025 B1 * | 10/2003 | Islam et al. .................. 359/334 |
| 6,731,426 B1 * | 5/2004 | Yeniay et al. ........... 359/341.32 |

(Continued)

FOREIGN PATENT DOCUMENTS

EP      0911926 A1      4/1999

(Continued)

OTHER PUBLICATIONS

Hecht, Jeff. Understandign fiebr optics 2nd ed. Sams Publishing. 1993 Indianapolis, IN. pp. 209-228.*

*Primary Examiner*—Jack Keith
*Assistant Examiner*—Ari M. Diacou
(74) *Attorney, Agent, or Firm*—Staas & Halsey LLP

(57) ABSTRACT

An optical amplifying apparatus has a plurality of pumping sources generating pumping light beams at different wavelengths, a Raman amplification medium receiving the pumping light beams from the pumping sources to amplify a main signal light beam by using stimulated Raman scattering phenomenon due to the pumping light beams, a rare-earth-doped optical amplification medium receiving the main signal light beam amplified by the Raman amplification medium to further amplify it, and a pumping light introducing means introducing a part or all of a pumping light beam at a specific wavelength of the pumping light beams as a pumping light beam for the rare-earth-doped optical amplification medium to the rare-earth-doped optical amplification medium. The optical amplifying apparatus in a smaller size and with less fluctuation in the optical output power can readily send monitoring control information irrespective of presence of the optical input power.

14 Claims, 10 Drawing Sheets

U.S. PATENT DOCUMENTS

| | | | |
|---|---|---|---|
| 6,775,056 B1 * | 8/2004 | Grubb et al. | 359/337.4 |
| 6,867,905 B1 * | 3/2005 | Griseri et al. | 359/334 |
| 6,891,659 B1 * | 5/2005 | Kikuchi | 359/334 |
| 6,954,305 B1 * | 10/2005 | Kakui | 359/337.3 |
| 2002/0060839 A1 * | 5/2002 | Oh et al. | 359/337.5 |
| 2003/0072064 A1 * | 4/2003 | Ohta | 359/177 |
| 2003/0076578 A1 * | 4/2003 | Goto et al. | 359/337.4 |
| 2003/0161031 A1 * | 8/2003 | Benjamin et al. | 359/337.4 |

FOREIGN PATENT DOCUMENTS

| | | |
|---|---|---|
| EP | 0963065 A2 | 12/1999 |
| EP | 1054489 A2 | 11/2000 |
| EP | 1233484 A1 | 8/2002 |
| EP | 1054489 A3 | 10/2003 |
| JP | 2001-117126 | 4/2001 |
| WO | WO 98/42088 | 9/1998 |

* cited by examiner

OPTICAL AMPLIFYING APPARATUS WHICH ROUTES PUMPING LIGHT TO A RAMAN AMPLIFICATION MEDIUM AND A RARE-EARTH-DOPED OPTICAL AMPLIFICATION MEDIUM

BACKGROUND OF THE INVENTION (1) Field of the Invention

The present invention relates to an optical amplifying apparatus, and particularly to an optical amplifying apparatus suitable for use in an optical repeater which carries out Raman amplification.

(2) Description of Related Art

With an increase in information communication quantity, actively developed is an optical fiber communication system of a large capacity and at a low cost. A wavelength division multiplexing (WDM) transmission system, which multiplexes optical signals at a plurality of wavelengths as channel signals and transmits them, is studied and developed in order to increase the capacity. In order to decrease the cost, there is a demand for a long distance system in which a distance between a terminal station (station converting optical signals into electric signals, and again regenerating the optical signals) and a terminal station can be as long as possible.

In the latter, it is important how low the optical noise level generating in an optical amplifier disposed in a repeater can be suppressed, in order to increase the distance between a terminal station and another terminal station as much as possible. With respect to this point, a distributed Raman amplifier (DRA) attracts attention, and is gradually introduced into a real system in recent years.

Heretofore, optical signals are intensively amplified by a rare-earth [particularly, erbium (Er)]-doped optical fiber amplifier (EDFA) in a repeater. Although having the capability of amplifying at a high gain, the EDFA generates a relatively large quantity of noise, which is one of factors that limit the transmission distance of the whole system. Even if optical signals transmitted for a long distance can be received at a sufficient level (power) by an optical receiving terminal station, a phenomenon that the signals cannot be normally demodulated occurs because the optical SN ratio (OSNR: Optical Signal to Noise Ratio) representing the quality of the received signals is deteriorated.

In order to avoid such a phenomenon, a DRA (refer to a patent document cited below, for example) is disposed immediately before the EDFA to compensate a part of transmission loss caused by an optical transmission line (optical fiber), and the EDFA intensively amplifies optical signals, as a structure of an optical amplifier in the repeater (hereinafter referred as an amplifier structure).

The DRA is an optical amplifier of a distributed amplification type that uses the optical transmission line to distributively amplify the optical signals. Accordingly, the advantage of this amplifier structure is that it is possible to amplify the optical signals with lower noise than the EDFA, while the gain thereof is smaller than the EDFA, so that this amplifier structure is expected to have an effect of improvement of OSNR as compared with a system constituted with only the EDFA.

FIG. 10 shows a general structure of a repeater (hereinafter referred as a Raman amplification repeater) using a DRA. A Raman amplification repeater shown in FIG. 10 has pumping sources (LDs: Laser Diodes) 600 and 700 at a plurality of wavelengths (two wavelengths, here). Optical signals at respective wavelengths sent from these pumping sources 600 and 700 are combined by a combiner (a polarized wave combiner or a wavelength combiner) 800, then sent from a WDM coupler 200 to an optical transmission line 100 in the opposite direction to the transmission direction of a main signal light beam (counterpropagating pumping).

In FIG. 10, reference character 300 denotes an isolator which transmits light beams in only one direction (a main signal light beam transmission direction), 400 a coupler for power monitoring which splits and leads a part thereof to monitor the repeater output, and 500 a photodiode (PD) for power monitoring which receives an optical output split by the coupler 400 to generate an electric signal according to a power thereof.

In the Raman amplification repeater structured as above, a pumping light beam wavelength of one pumping source 600 is, for example, 1440 nm and a pumping light beam wavelength of the other pumping source 700 is, for example, 1480 nm, and Raman amplification is developed, centered at about wavelengths of 1540 nm and 1580 nm shifted from the pumping light beam wavelengths of 1440 nm and 1480 nm by about 100 nm toward the longer wavelengths, respectively, to amplify the main signal light beam.

The ratio of the pumping light beam powers at the above two wavelengths is set to about 3:2 to 4:1 (the wavelength and power of a pumping light beam differing from system to system, cable to cable, etc.) There are mainly two reasons why the ratio of the pumping light beam powers differs as above:

(1) wavelength dependency of cable loss (the shorter the wavelength, the greater the loss);

(2) Raman amplification between pumping light beams (a pumping light beam at the longer wavelength being amplified with a pumping light beam at the shorter wavelength).

Necessary monitoring control information (fault information, pumping light beam power control information to the upstream, etc.) is modulated on the main signal light beam on the basis of optical output powers (electric signals) obtained by the PD for power monitoring 500, whereby the monitoring control information can be transmitted to another node (a repeater or a terminal station). Although not shown in FIG. 10, the optical repeater in the up link and the optical repeater in the down link are symmetrical in structure (transmission system) (for example, an optical submarine communication system), and the monitoring control information is transmitted to the upstream, using another transmission system.

[Patent Document 1]

Japanese Patent Laid-Open Publication No. 2001-117126

The gain of a Raman amplifier has a characteristic that the optical output power fluctuates with a fluctuation in the optical input power. When the optical input power decreases by 1 dB, for example, the optical output power decreases by about 0.9 dB ($\Delta Pout/\Delta Pin \approx 0.9$ dB/dB). For this, in the general Raman amplifier, it is necessary to increase the pumping light power to increase the optical output power, or to reflect a plurality of pumping light beams by a pumping light reflector interposed in the front stage of an optical fiber (hereinafter referred as a Raman fiber), which is a Raman amplification medium, in the same direction as a main signal light beam in a counterpropagating pumping structure to increase the total input pumping light power to the Raman fiber, thereby to increase the pumping efficiency of the Raman amplifier, as proposed in the above patent document 1 (refer to, mainly, paragraphs [0018] and [0019], and FIGS. 1, 3 and 5).

In a submarine communication system having a pumping source shared by the up link and the down link of the optical amplifier (redundant structure), it is impossible to control the optical output power of only one link. When the optical output power of one link fluctuates, the optical output power of the other link fluctuates at the same time, it is thus difficult to constantly control the optical output powers.

Such a fluctuation in the optical output power can be decreased in the whole optical repeater by disposing an EDFA in the rear stage of the Raman amplifier, as described above. In which case, a pumping source to be used for only the EDFA becomes necessary, separately from a pumping source for Raman amplification, of course, which increases the size of the apparatus.

Since the optical transmission line itself is an amplification medium in the Raman amplifier, breakage or the like of the optical transmission line occurring at a position very close to the repeater causes loss of the amplification medium, so that monitoring control information cannot be sent.

SUMARY OF THE INVENTION

In the light of the above problems, an object of the present invention is to provide an optical amplifying apparatus, which can be manufactured in a smaller size and at a lower cost, and which can decrease fluctuations in optical output power and can readily send the monitoring control information irrespective of presence of the optical input power.

The present invention therefore provides an optical amplifying apparatus comprising a plurality of pumping sources generating pumping light beams at different wavelengths, a Raman amplification medium receiving the pumping light beams from the pumping sources to amplify a main signal light beam by using stimulated Raman scattering phenomenon due to the pumping light beams, a rare-earth-doped optical amplification medium receiving the main signal light beam amplified by the Raman amplification medium to further amplify the main signal light beam, and a pumping light introducing means introducing a part or all of a pumping light beam at a specific wavelength of the pumping light beams as a pumping light beam for the rare-earth-doped optical amplification medium to the rare-earth-doped optical amplification medium.

Wherein, the pumping light introducing means may be a reflection-type fiber grating disposed between the Raman amplification medium and the rare-earth-doped optical amplification medium to reflect a part of the pumping light beam at the specific wavelength to the rare-earth-doped optical amplification medium, and transmitting a rest of the pumping light beam to the Raman amplification medium.

Alternatively, the pumping light introducing means may be an optical coupler disposed between the Raman amplification medium and the rare-earth-doped optical amplification medium to split the pumping light beam at the specific wavelength, introducing a part of the pumping light beam at the specific wavelength to the rare-earth-doped optical amplification medium, and introducing a rest of the pumping light beam to the Raman amplification medium.

The present invention further provides an optical amplifying apparatus comprising a plurality of counterpropagating pumping sources generating pumping light beams at different wavelengths, a copropagating pumping source generating a pumping light beam at a specific wavelength identical to at least any one of the wavelengths of the pumping light beams generated by the counterpropagating pumping sources, a Raman amplification medium receiving pumping light beams from the counterpropagating pumping sources from one direction and receiving the pumping light beam from the copropagating pumping source from other direction to amplify a main signal light beam by using stimulated Raman scattering phenomenon due to the pumping light beams from the both directions, a rare-earth-doped optical amplification medium receiving the main signal light beam amplified by the Raman amplification medium to further amplify the main signal light beam, and a pumping light introducing means introducing a part or all of the pumping light beam at the specific wavelength of the pumping light beams from the counterpropagating pumping sources as a pumping light beam for the rare-earth-doped optical amplification medium to the rare-earth-doped optical amplification medium, and transmitting at least the pumping light beam at the specific wavelength from the copropagating pumping source as another pumping light beam for the rare-earth-doped optical amplification medium.

Wherein, the pumping light introducing means may be a reflection-type fiber grating disposed between the Raman amplification medium and the rare-earth-doped optical amplification medium to reflect a part of the pumping light beam at the specific wavelength to the rare-earth-doped optical amplification medium, transmitting a rest of the pumping light beam to the Raman amplification medium, and transmitting the pumping light beam from the copropagating pumping source to the rare-earth-doped optical amplification medium.

Alternatively, the pumping light introducing means may be an optical coupler disposed between the Raman amplification medium and the rare-earth-doped optical amplification medium to split the pumping light beam at the specific wavelength, introducing a part of the pumping light beam at the specific wavelength to the rare-earth-doped optical amplification medium, introducing a rest of the pumping light to the Raman amplification medium, and transmitting a pumping light beam from the copropagating pumping source to the rare-earth-doped optical amplification medium.

The pumping light introducing means may introduce a pumping light beam at a longer wavelength as the pumping light beam at the specific wavelength to the rare-earth-doped optical amplification medium.

It is preferable that the pumping sources intensity-modulate the pumping light beams according to monitoring control information to be transmitted.

The optical amplifying apparatus according to this invention provides the following effects and advantages:

(1) A part or all of pumping light beams at a plurality of wavelengths for the Raman amplification medium are introduced as pumping light beams for the rare-earth-doped optical amplification medium in the rear stage to the rare-earth-doped optical amplification medium. Accordingly, it is possible to suppress fluctuations in the optical output power, and readily send the monitoring control information by intensity-modulating reflected light, without a pumping source exclusively used for the rare-earth-doped optical amplification medium (which allows the optical amplifying apparatus to be reduced in size and cost) and irrespectively of presence of the input light.

(2) In a bidirectional pumping structure of the Raman amplification medium, a part or all of a pumping light beam at a specific wavelength of a plurality of pumping light beams from the counterpropagating pumping sources is introduced as a pumping light beam for the rare-earth-doped optical amplification medium to the rare-earth-doped amplification medium, and a pumping light beam at the specific wavelength from the copropagating pumping source is transmitted as a pumping light beam for the rare-earth-doped optical amplification medium. Accordingly, it is possible to provide advantages similar to the above, and largely improve the pumping efficiency of both the Raman amplification medium and the rare-earth-doped optical amplification medium.

(3) It is possible to dispose a reflection-type fiber grating between the Raman amplification medium and the rare-earth-doped optical amplification medium to reflect a part of a pumping light at the specific wavelength to the rare-earth-doped optical amplification medium and to transmit a rest of it to the Raman amplification medium, whereby the part of the pumping light beam for the Raman amplification medium can be readily introduced to the rare-earth-doped optical amplification medium.

(4) In a bidirectional pumping structure, it is possible to dispose a reflection-type fiber grating between the Raman amplification medium and the rare-earth-doped optical amplification medium to reflect a part of a pumping light beam at the specific wavelength and to transmit a rest of it to the Raman amplification medium, while allowing a pumping light beam from a copropagating pumping source to be transmitted to the rare-earth-doped optical amplification medium, whereby the equivalent function to the above can be readily realized.

(5) It is alternatively possible to dispose an optical coupler between the Raman amplification medium and the rare-earth-doped optical amplification medium to split a pumping light beam at the specific wavelength to introduce a part of it to the rare-earth-doped optical amplification medium and a rest of it to the Raman amplification medium, whereby the equivalent function to the above can be realized. In which case, it is possible to further reduce the cost as compared with a case where a reflection-type fiber grating is used.

(6) Similarly, in a bidirectional pumping structure, it is possible to dispose an optical coupler between the Raman amplification medium and the rare-earth-doped optical amplification medium to split a pumping light beam at the specific wavelength to introduce a part of it to the rare-earth-doped optical amplification medium and a rest of it to the Raman amplification medium, while allowing a pumping light beam from a copropagating pumping source to be transmitted to the rare-earth-doped optical amplification medium, whereby the equivalent function to the above can be realized.

(7) When the pumping light beam at the specific wavelength to be used as a pumping light beam for the rare-earth-doped optical amplification medium is a pumping light beam at a longer wavelength that generally has a sufficient allowance in the pumping light power, it is possible to sufficiently give necessary pumping light powers to both Raman amplification medium and the rare-earth-doped optical amplification medium.

(8) When the pumping sources intensity-modulate the pumping light beams according to monitoring control information to be transmitted, it is possible to readily send the monitoring control information irrespective of presence of input light.

DESCRIPTION OF THE PREFERRED EMBODIMENTS

Hereinafter, description will be made of embodiments of the present invention with reference to the drawings.

(A) Description of First Embodiment

Figure 1:
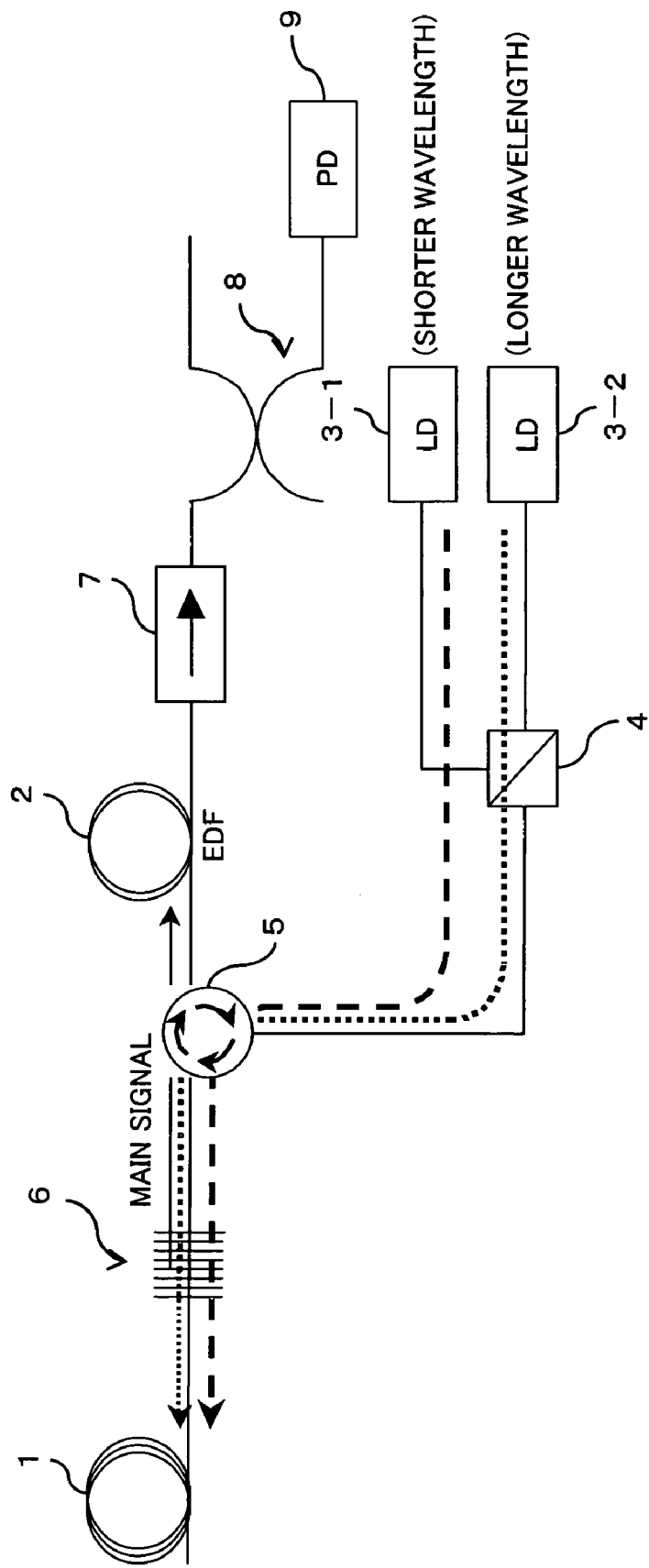
FIG. 1 is a block diagram showing an essential part of a Raman amplification repeater (an optical amplifying apparatus) according to a first embodiment of this invention.

FIG. 1 is a block diagram showing a structure of an essential part of a Raman amplification repeater (optical amplifying apparatus) according to a first embodiment of this invention. The Raman amplification repeater shown in FIG. 1 comprises an optical transmission line 1, an EDF 2, a plurality (two, here) of pumping sources 3-1 and 3-2, a combiner 4, a circulator 5, a reflection-type fiber grating 6 disposed between the optical transmission line 1 and the EDF 2, an isolator 7 disposed in the rear stage of the EDF 2, a coupler for power monitoring 8, and a photodiode (PD) for power monitoring 9.

The optical transmission line 1 is an optical fiber (hereinafter, referred as a Raman fiber 1 occasionally), which is a gain medium (a Raman amplification medium) of Raman amplification. The optical transmission line 1 transmits a main signal light beam [wavelength-division-multiplexed (a WDM light beam)], and receives pumping light beams generated by the pumping sources 3-1 and 3-2 to amplify the main signal light beam with the pumping light beams by taking advantage of the stimulated Raman scattering phenomenon.

The EDF (a rare-earth-doped optical amplification medium) 2 further amplifies the main signal light beam that has been Raman-amplified by the Raman fiber 1. As well known, the EDF 2 is an optical fiber amplifier (hereinafter referred as an EDF 2, occasionally), which is made by doping a fiber core with erbium (Er) ions being as rare earth ions. As the amplification medium 2, sometimes used is what is made by doping the fiber core with lanthanoide series rare earth ions such as praseodymium (Pr) ions, thulium (Tm) ions or the like, other than erbium ions. Generally, the EDF is most widely used in the WDM transmission system because it gives a wide main signal optical wavelength band, and achieves a high gain and a low loss.

The pumping sources (counterpropagating pumping sources) 3-1 and 3-2 are laser diodes (LDs) which generate pumping light beams at different wavelengths for Raman amplification developed by the Raman fiber 1. In this case, the pumping source 3-1 generates a pumping light beam at a wavelength of 1440 nm, while the pumping source 3-2 generates a pumping light beam at a wavelength of 1480 nm. Setting of wavelengths of these pumping light beams may be suitably changed, of course.

The combiner (a polarized wave combiner or a wavelength combiner) 4 combines the pumping light beams from the pumping sources 3-1 and 3-2. The circulator 5 allows a main signal light beam from the Raman fiber 1 to pass therethrough to the EDF 2, while introducing the pumping light beams from the combiner 4 to the Raman fiber 1 from the back of the Raman fiber 1 (namely, in the opposite direction to the transmission direction of the main signal light beam). An isolator may be disposed between the combiner 4 and the circulator 5 in order to prevent backward-reflected light to the pumping sources 3-1 and 3-2.

Figure 10:
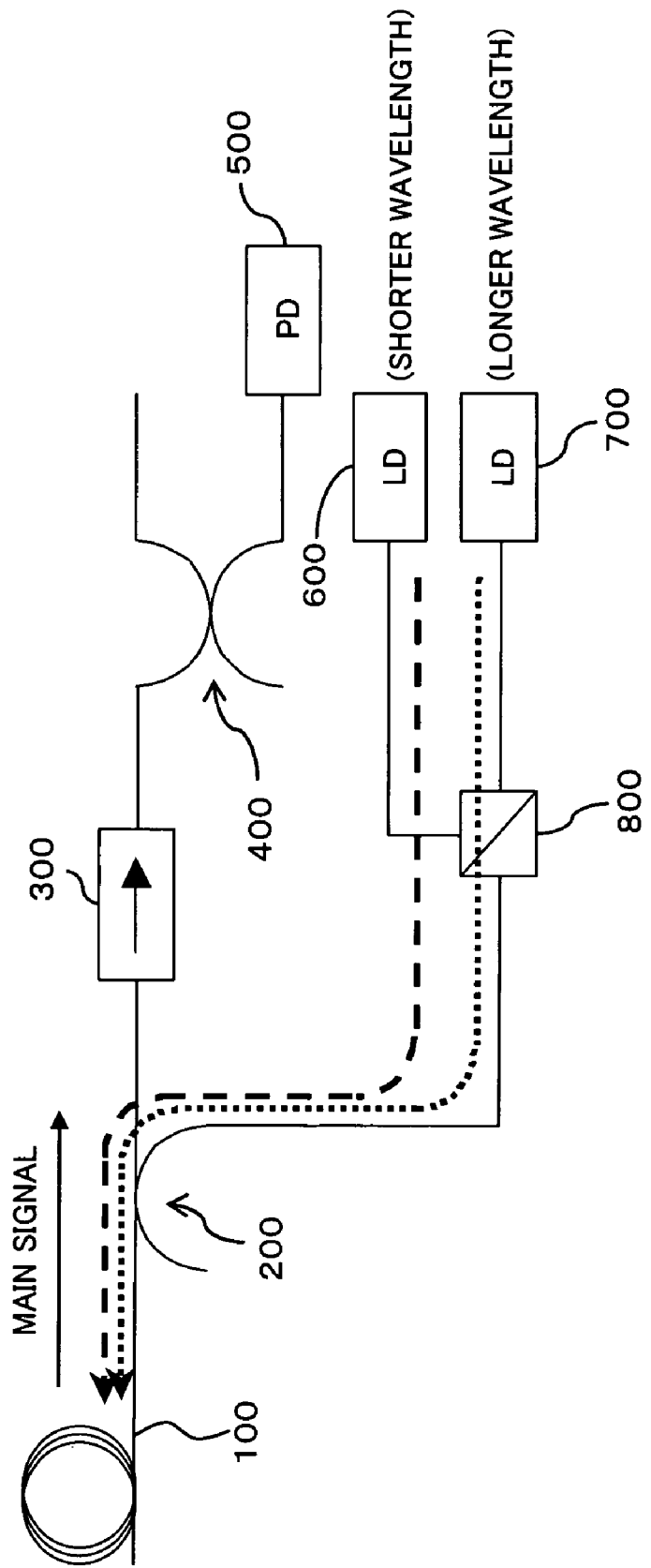
FIG. 10 is a block diagram showing a known structure of a Raman amplification repeater.

The isolator 7 permits the main signal light beam to be transmitted only in one direction in order to prevent backward-reflected light to the EDF 2. The coupler for power monitoring 8 and the PD for power monitoring 9 are similar to those described above with reference to FIG. 10.

The reflection-type fiber grating (a pumping light introducing means) 6 is a fiber grating of a reflection type which can select a wavelength. Here, the reflection-type fiber grating 6 reflects a part of the pumping light beam (1480 nm) at the longer wavelength of the pumping light beams at the two wavelengths from the circulator 5 [allowing the rest of the pumping light beam at the longer wavelength and the pumping light (1440 nm) at the shorter wavelength to pass therethrough to the Raman fiber 1], so that the reflected light beam is introduced as a pumping light beam for the EDF 2 to the EDF 2.

It is possible to obtain sufficient gains in both the amplification media, the Raman fiber 1 and the EDF 2, by setting the reflectance of the pumping light beam at the longer wavelength in the reflection-type fiber grating 6. The reflectance may be about 10–50%, but the most suitable value differs from system to system.

With such the structure employed, the pumping source 3-2 at the longer wavelength is used as a pumping source for both the Raman fiber 1 and the EDF 2, so that an exclusive pumping source for the EDF 2 becomes unnecessary. Why a part of the pumping light beam at the longer wavelength is reflected as this is that the pumping light power at the longer wavelength generally has more sufficient margin than the pumping light power at the shorter wavelength because of the Raman amplification phenomenon between pumping light beams at different wavelengths (that is, a pumping light beam at the longer wavelength is amplified by a pumping light beam at the shorter wavelength), as described above.

In the Raman amplification repeater structured as above according to this embodiment, the main signal light beam is Raman-amplified in the Raman fiber 1 with pumping light beams transmitted through the reflection-type fiber grating 6 of the pumping light beams from the pumping sources 3-1 and 3-2, that is, a pumping light beam (1480 nm) at the longer wavelength not reflected by the reflection-type fiber grating 6 and all the pumping light beam (1440 nm) at the shorter wavelength.

The Raman-amplified main signal light beam is transmitted through the reflection-type fiber grating 6 and the circulator 5, and inputted to the EDF 2. The main signal light beam is further amplified in the EDF 2 with a pumping light beam (1480 nm) at the longer wavelength reflected by the reflection-type fiber grating 6.

Figure 2:
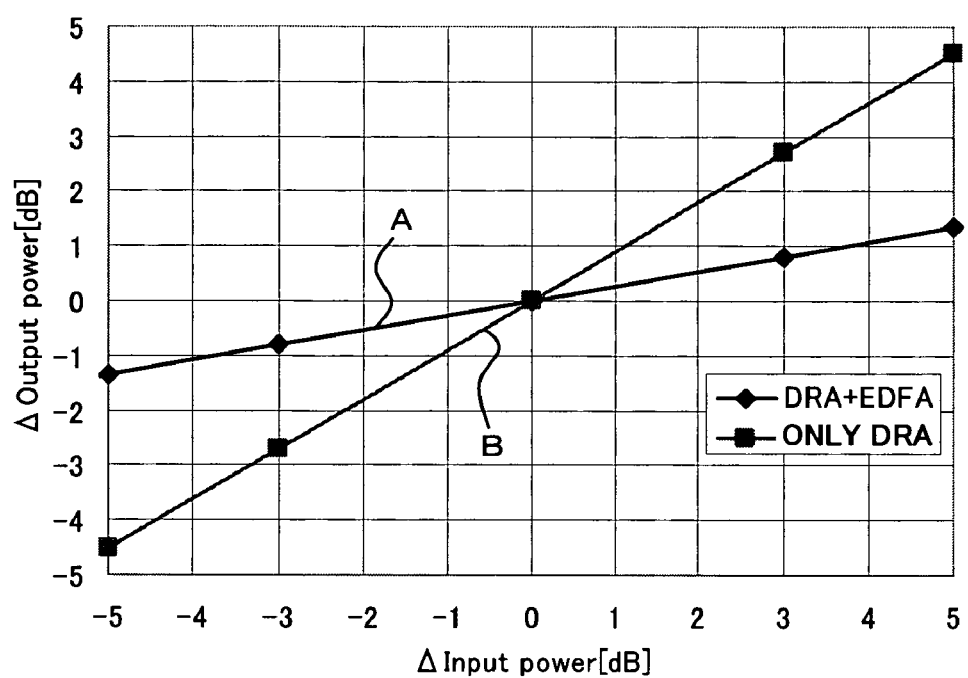
FIG. 2 is a diagram showing an example of fluctuations in optical output power with fluctuations in optical input power in the Raman amplification repeater shown in FIG. 1.

The EDF 2 has a smaller fluctuation in the optical output power than a fluctuation in the optical input power. When the optical input power is decreased by 1 dB, for example, a decrease in the optical output power is as small as about 0.1 to 0.3 dB ($\Delta$Pout/$\Delta$Pin$\approx$0.1 to 0.3 dB/dB), which means that the fluctuation in the optical input power is compressed. When the Raman amplification and the EDF 2 are both used as this example, the fluctuation in the optical output power with the fluctuation in the optical input power is not greater than 30% of when only Raman amplification is used (refer to a solid line B) as shown by a solid line A in FIG. 2.

When the structure in which a part of the pumping light beam is reflected by the reflection-type fiber grating 6 is employed as this, a reflected light beam (a part of the pumping light beam at the longer wavelength) from the reflection-type fiber grating 6 is always inputted to the EDF 2 even if a transmission line fault such as fiber cut or the like occurs in the front stage of the reflection-type fiber grating 6.

Accordingly, it is possible to intensity-modulate the driving current of the pumping source 3-2 at the longer wavelength to intensity-modulate the above reflected light beam to be inputted to the EDF 2, for example. Consequently, by intensity-modulating the pumping light beam (that is, the driving current) of the pumping source 3-2 according to necessary monitoring control information, it is possible to transmit the necessary monitoring control information to the downstream irrespective of presence of the input light (power) to the Raman amplification repeater.

In summary, the Raman amplification repeater according to this embodiment provides the following effects and advantages:

(1) Combining the Raman amplification and the EDF 2 can suppress fluctuations in the optical output power;
(2) Using the refection-type fiber grating 6 makes it possible to dispense with an exclusive pumping source for the EDF 2 (that is, it is possible to decrease the size and the cost of the Raman amplification repeater).
(3) Using the reflection-type fiber grating 6 enables easy transmission of the monitoring control information, by intensity-modulating the reflected light beam.

(A1) Description of Modification of First Embodiment

Figure 3:
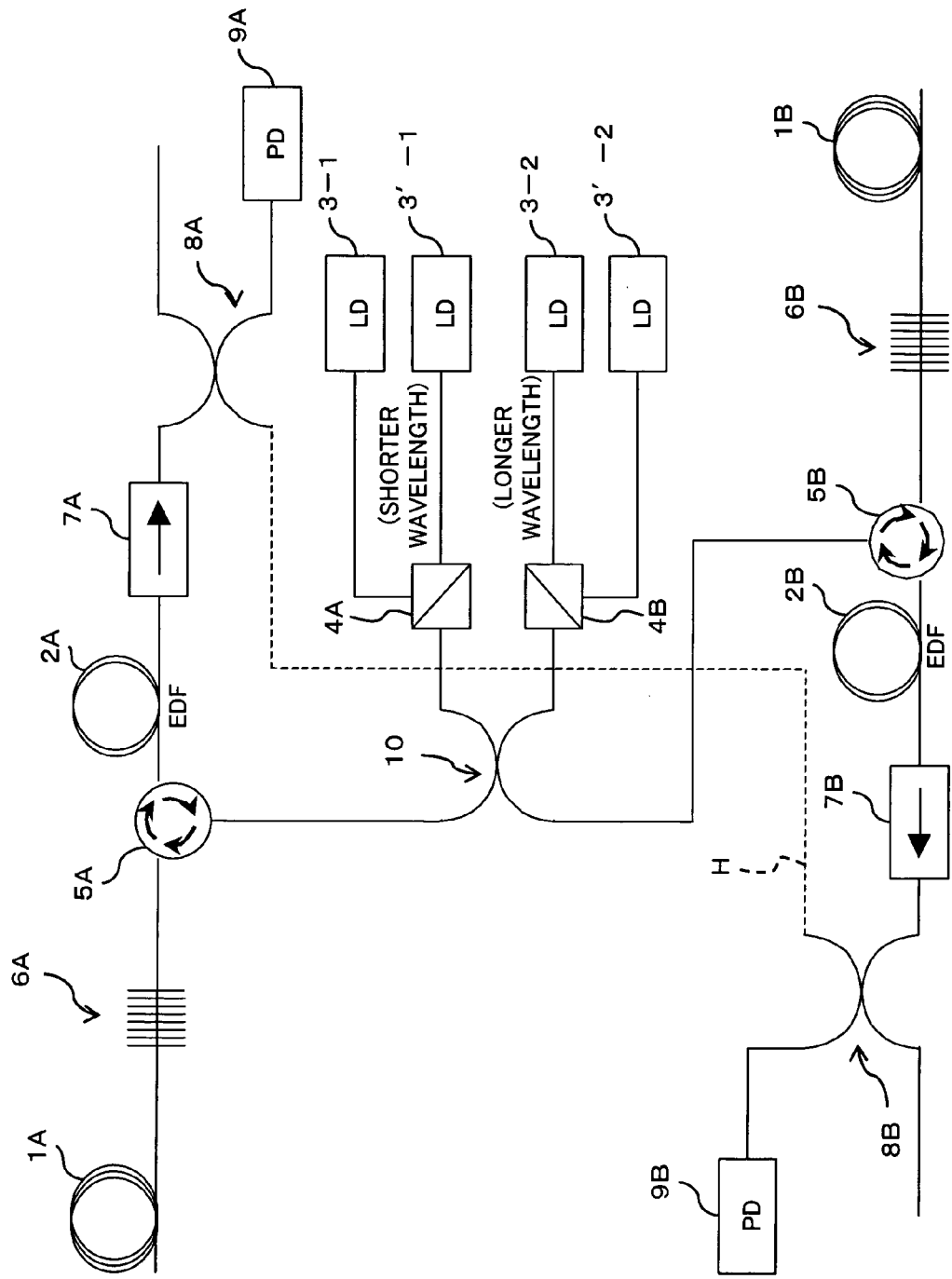
FIG. 3 is a block diagram showing a structure in which the structure shown in FIG. 1 is applied as a basic structure to a transmission system of a bidirectional Raman amplification repeater for an up link and a down link.

FIG. 3 shows a structure in which the basic structure described above with reference to FIG. 1 is applied as a transmission system of a bidirectional Raman amplification repeater for the up link and the down link. As shown in FIG. 3, this Raman amplification repeater comprises, as one transmission line (hereinafter, supposed to be the down link), a Raman fiber 1A, a reflection-type fiber grating 6A, a circulator 5A, an EDF 2A, an isolator 7A, a coupler for power monitoring 8A and a PD for power monitoring 9A in the order the light is inputted, and comprises, as the other transmission line (the up link), a Raman fiber 1B, a reflection-type fiber grating 6B, a circulator 5B, an EDF 2B, an isolator 7B, a coupler for power monitoring 8B and a PD for power monitoring 9B, as well.

The Raman fibers 1A and 1B, the reflection-type fiber gratings 6A and 6B, the circulators 5A and 5B, the EDFs 2A and 2B, the isolators 7A and 7B, the couplers for power monitoring 8A and 8B and PDs for power monitoring 9A and 9B are the same as or similar to the Raman fiber 1, the reflection-type fiber grating 6, the circulator 5, the EDF 2, the isolator 7, the coupler for power monitoring 8, and the PD for power monitoring 9 described above.

In FIG. 3, a dotted line H expresses that the monitoring control information or the like can be looped back from the up link to the down link, or from the down link to the up link, through the couplers for power monitoring 8A and 8B.

In this Raman amplification repeater, there are also provided two pumping sources 3-1 and 3'-1 as pumping sources at the shorter wavelength, two pumping sources 3-2 and 3'-2 as pumping sources at the longer wavelength, polarized wave combiners 4A and 4B, and a 1:1 coupler 10.

The pumping sources 3-1 and 3'-1 at the shorter wavelength generate pumping light beams at the same wavelength (for example, 1440 nm) but having planes of polarization differing from each other. The pumping sources 3-2 and 3'-2 at the longer wavelength generate pumping light beams at the same wavelength (for example, 1480 nm) but having planes of polarization differing from each other. This example gives a redundant structure to the pumping sources at both the shorter wavelength and the longer wavelength, thereby to prevent the pumping light beam from being lost even when one of the pumping sources becomes unusable or its output power falls due to a fault or the like. It is needless to say that, principally, a structure employing only the pumping sources 3-1 and 3-2 causes no problem (the same with FIGS. 7 and 8 to be described later).

The polarized wave combiner 4A for the shorter wavelength combiners (polarized-wave-combines) the pumping light beams at the same shorter wavelength (1440 nm). Similarly, the polarized wave combiner 4B for the longer wavelength combines (polarized-wave-combines) the pumping light beams at the longer wavelength (1480 nm) The 1:1 coupler 10 splits outputs of these polarized wave combiners 4A and 4B at the same power ratio (1:1), and inputs the split outputs to the circulators 5A and 5B.

In the Raman amplification repeater according to this modification structured as above, the pumping light beams at the shorter wavelength and the longer wavelength (1440 nm, 1480 nm) are slip by the 1:1 coupler 10 at the same power ratio, inputted to the circulators 5A and 5B for the up link and the down link, and introduced to the Raman fibers 1A and 1B. A part of the pumping light beam at the longer wavelength (1480 nm) is reflected by the corresponding reflection-type fiber grating 6A or 6B, and introduced as a pumping light beam for the EDF 2A or 2B to the EDF 2A or 2B.

In the bidirectional optical communication over the up link and the down link, this modification can provide the same effects as the above-described embodiment. Namely, this modification can suppress fluctuations in the optical output power, does not need a pumping source for the EDF A2 only, and can readily send the monitoring control information irrespective of presence of the input light.

(B) Description of Second Embodiment

Figure 4:
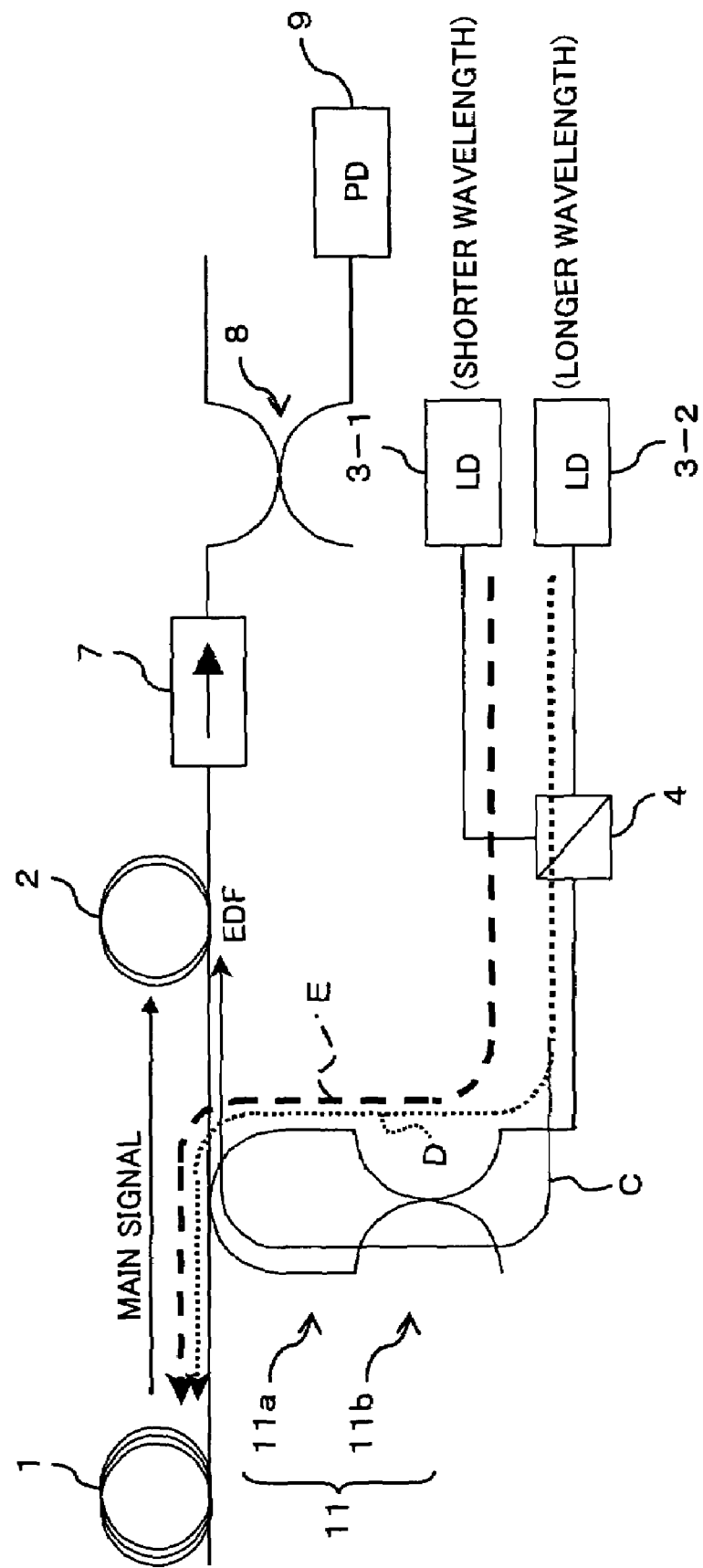
FIG. 4 is a block diagram showing a structure of an essential part of a Raman amplification repeater (an optical amplifying apparatus) according to a second embodiment of this invention.

FIG. 4 is a block diagram showing a structure of an essential part of a Raman amplification repeater (an optical amplifying apparatus) according to a second embodiment of this invention. The Raman amplification repeater shown in FIG. 4 comprises an optical transmission line (a Raman fiber) 1, an EDF 2, pumping sources 3-1 and 3-2, a combiner 4, an isolator 7, a coupler for power monitoring 8 and a PD for power monitoring 9, which are similar to those shown in FIG. 1. This Raman amplification repeater further comprises a hybrid coupler 11 which is a combination of a WDM 11a and a coupler 11b, instead of the circulator 5 and the reflection-type fiber grating 6 shown in FIG. 1.

Figure 5:
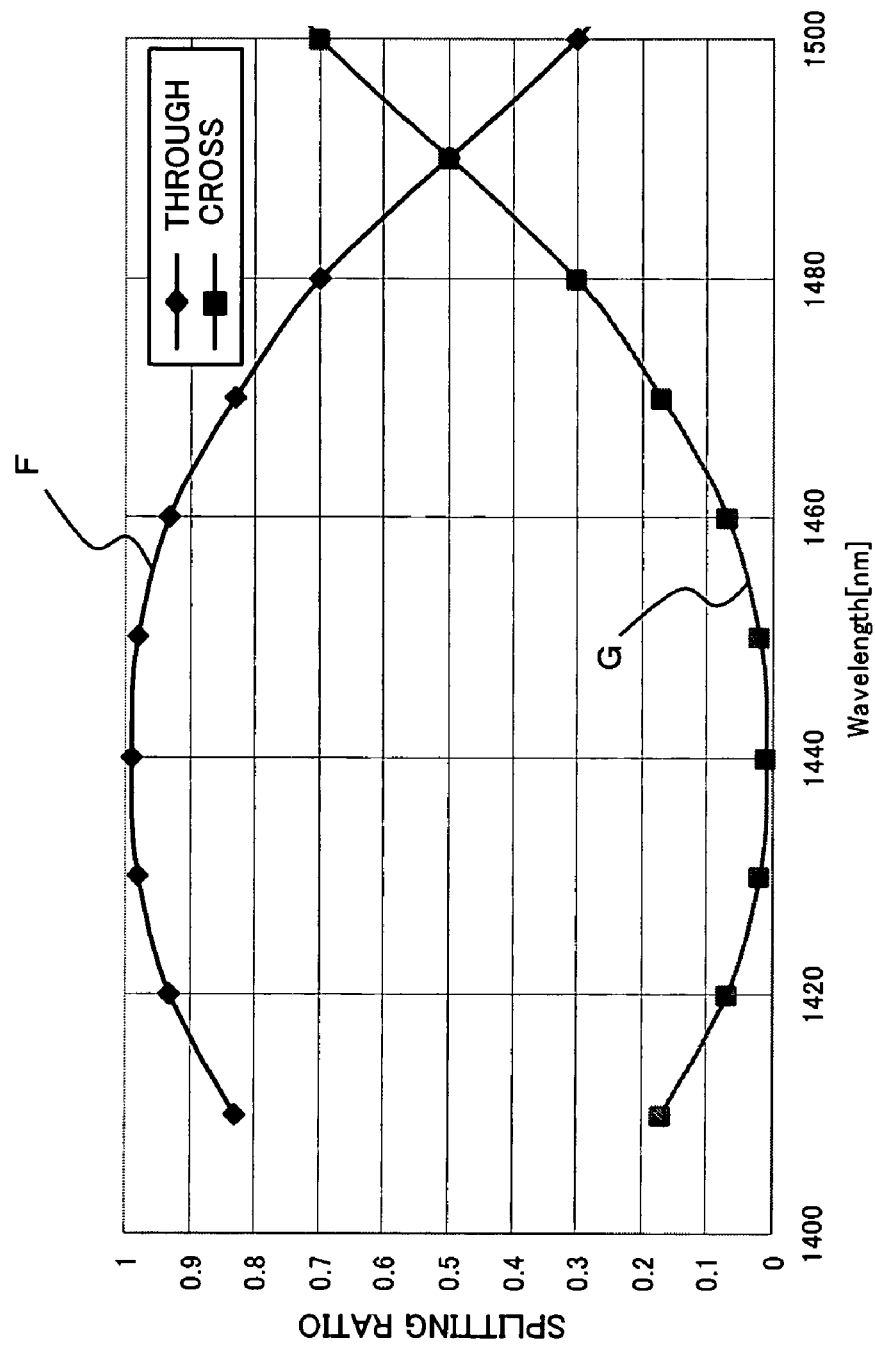
FIG. 5 is a diagram showing an example of wavelength-dependent branching ratio of a hybrid coupler shown in FIG. 4.

The hybrid coupler 11 has a wavelength-dependent splitting (through and cross) characteristic (a solid line F showing the through characteristic and a solid line G showing the cross characteristic in FIG. 5), as shown in FIG. 5. Namely, the hybrid coupler 11 is so designed to have a great wavelength dependency that the characteristic of the coupler is optimized at a pumping light wavelength (1440 nm) of the shorter wavelength (the through rate being about 100% and the cross rate being about 0%), and the splitting ratio is changed according to the wavelength (the through rate being 70% and the cross rate being 30% at the pumping wavelength 1480 nm in FIG. 5). Any optical device having such the splitting characteristic other than a coupler can be employed, of course.

A part (30% in the example shown in FIG. 5) of the pumping light beam (1480 nm) of the pumping source 3-2 at the longer wavelength is crossed (outputted to the output port positioned diagonally to the input port) by the coupler 11b, inputted to the WDM coupler 11a, and coupled with the main signal light beam to be transmitted to the EDF 2 by the WDM coupler 11a (refer to an arrow of a solid line C in FIG. 4). The rest (70%) of the pumping light beam (1480 nm) at the longer wavelength and all the pumping light beam (1440 nm) at the shorter wavelength are through the coupler 11b to be introduced to the Raman fiber 1 (refer to arrows of broken lines D and E in FIG. 4).

Without the reflection-type fiber grating 6 described above, the Raman amplification repeater shown in FIG. 4 realizes the equivalent function (the pumping light introducing means) to that shown in FIG. 1 with the hybrid coupler (optical coupler) 11 which is a combination of the WDM coupler 11a and the coupler 11b. This Raman amplification repeater can provide the same function and effects as that described in FIG. 1, and further decrease the cost as compared with the case where the reflection-type fiber grating 6 and the circulator 5 are used.

In this example, when the splitting ratio of the pumping light wavelength at the shorter wavelength (1440 nm) is 100:1, it is possible to provide sufficient gains in both the amplification media, the Raman fiber 1 and the EDF 2, if the branching ratio at the longer wavelength is about 10:1 to 1:1.

Figure 6:
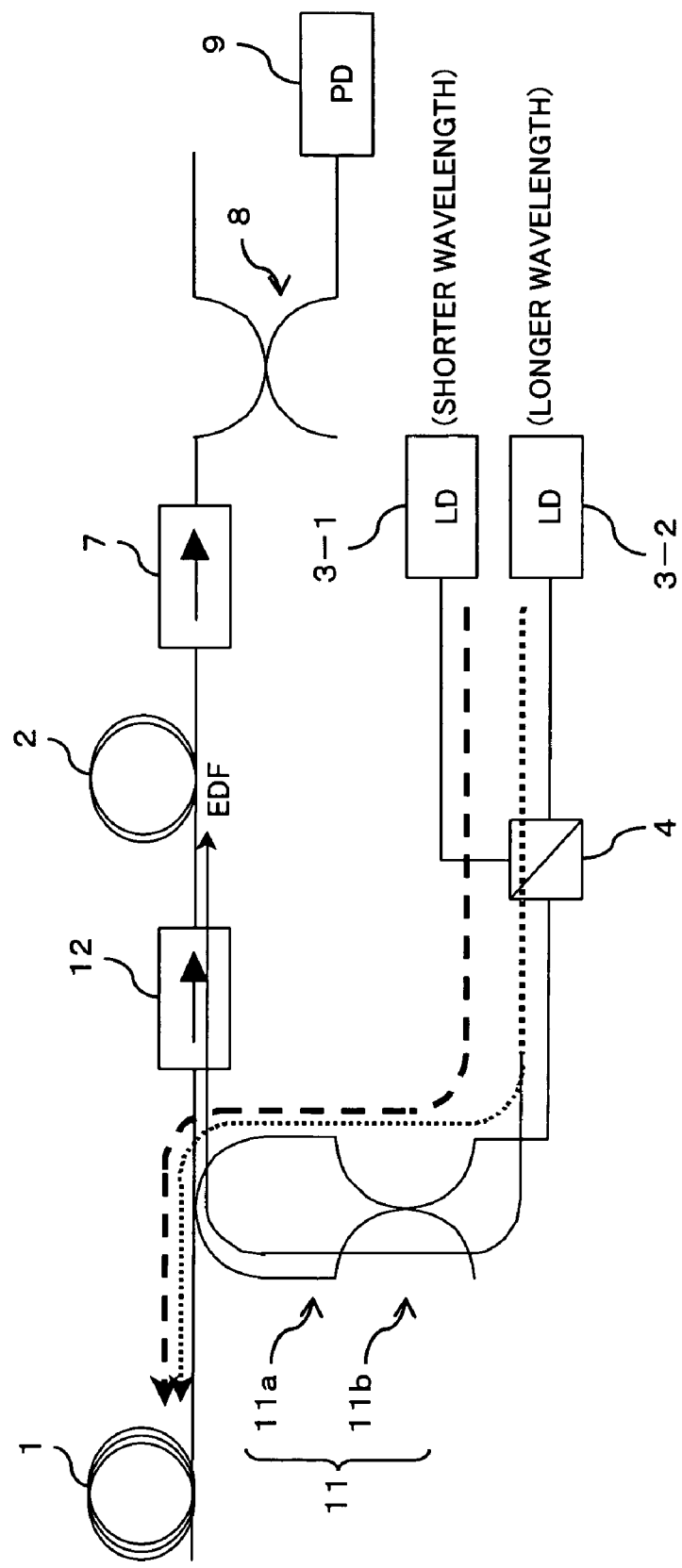
FIG. 6 is a block diagram showing a modified example of the Raman amplification repeater shown in FIG. 4.

In the structure shown in FIG. 1, the circulator 5 prevents backward-reflected light to the reflection-type fiber grating 6. Since the circulator 5 is unnecessary in this structure, it is preferable to interpose an isolator 12, which allows the main signal light beam to be transmitted to only the EDF 2, between the hybrid coupler 11 and the EDF 2, as shown in FIG. 6, for example.

(B1) Description of Modification of Second Embodiment

Figure 7:
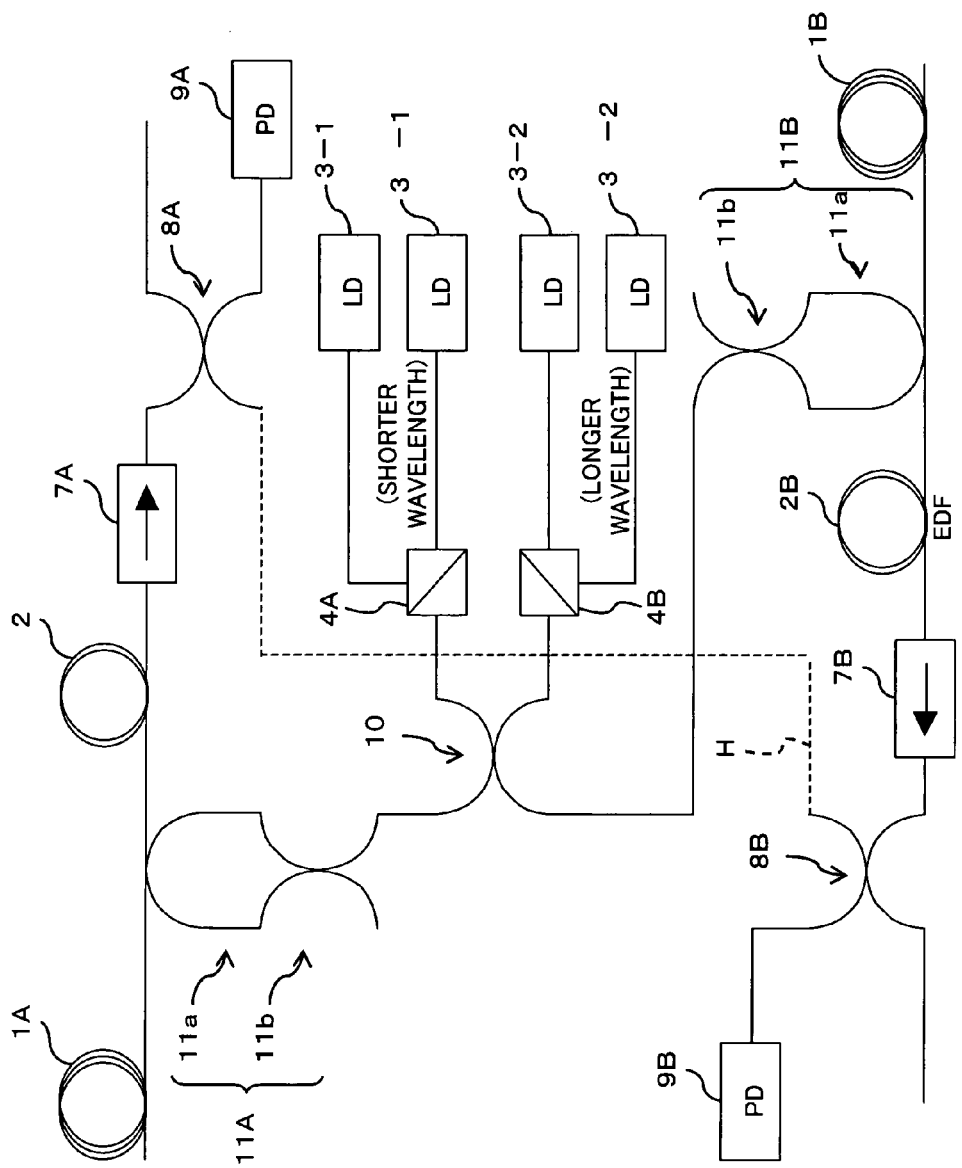
FIG. 7 is a block diagram showing a structure in which the structure shown in FIG. 4 is applied as a basic structure to a transmission system of a bidirectional Raman amplification repeater for an up link and a down link.
Figure 8:
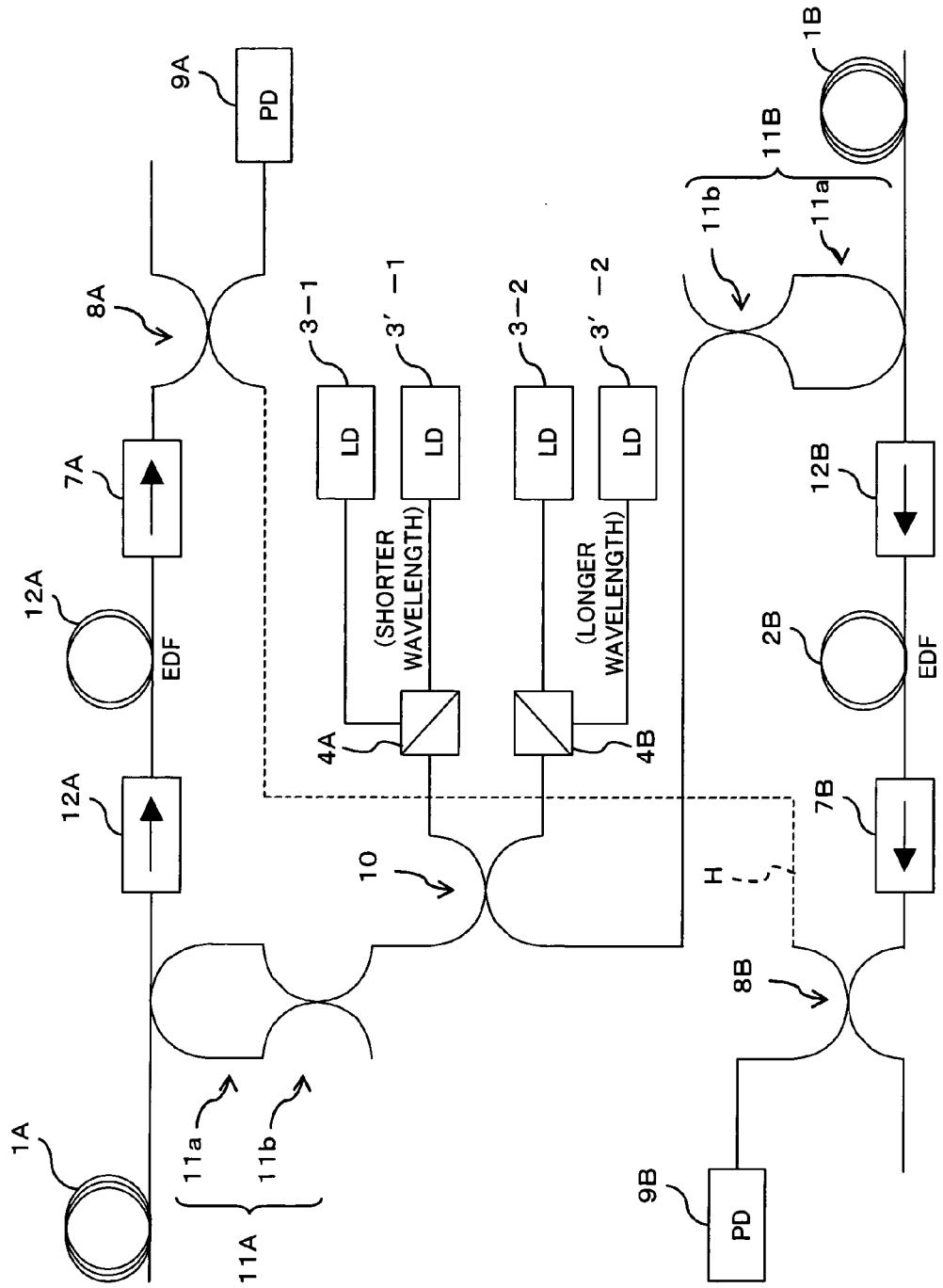
FIG. 8 is a block diagram showing a structure in which the structure shown in FIG. 6 is applied as a basic structure to a bidirectional Raman amplification repeater for an up link and a down link.

FIG. 7 is a diagram showing a structure in which the basic structure shown in FIG. 4 is applied as a transmission system of a bidirectional Raman amplification repeater for the up link and the down link. FIG. 8 is a diagram showing a structure in which the basic structure shown in FIG. 6 is applied as a transmission system of a bidirectional Raman amplification repeater for the up link and the down link.

Each of the Raman amplification repeaters shown in FIGS. 7 and 8 realizes the equivalent function to that of the Raman amplification repeater shown in FIG. 3 by applying the hybrid couplers 11A and 11B, each of which is a combination of the WDM coupler 11a and the coupler 11b described above, instead of the reflection-type fiber gratings 6A and 6B and the circulators 5A and 5B in the structure described above with reference to FIG. 3, to a transmission system of the up link and the down link. The structure shown in FIG. 8 differs from the structure shown in FIG. 7 in that isolators 12A and 12B fulfilling the similar function to that of the isolator 12 described above are disposed in the up link and the down link, respectively.

Each of the Raman amplification repeaters shown in FIGS. 7 and 8 provides the same function and effects as those described above with reference to FIGS. 1, 3, 4 and 6.

(C) Description of Third Embodiment

Figure 9:
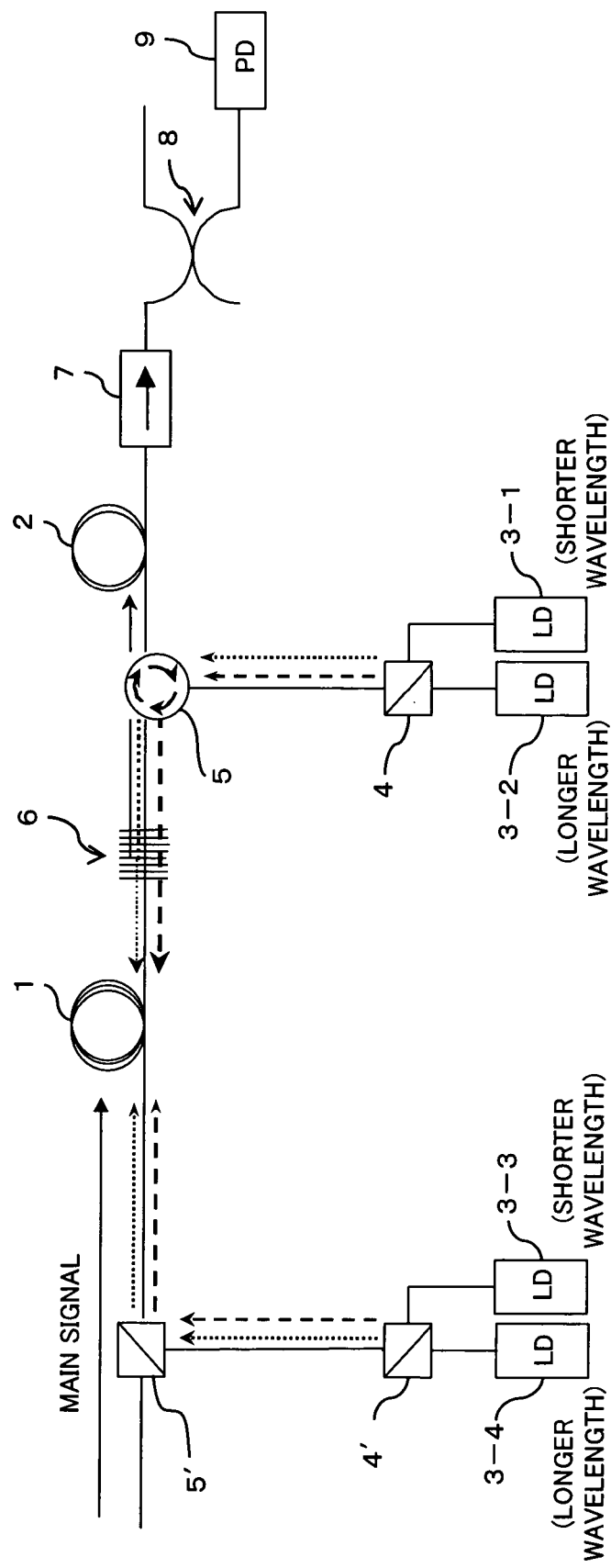
FIG. 9 is a block diagram showing a structure of an essential part of a Raman amplification repeater (an optical amplifying apparatus) according to a third embodiment of this invention.

FIG. 9 is a block diagram showing a structure of an essential part of a Raman amplification repeater (an optical amplifying apparatus) according to a third embodiment of this invention. The Raman amplification repeater shown in FIG. 9 is further provided with pumping sources (copropagating pumping sources) 3-3 and 3-4, a combiner 4' and a coupler 5' as compared with the structure shown in FIG. 1 described above, wherein pumping light beams generated by the pumping sources 3-3 and 3-4 are introduced to the Raman fiber 1 through the combiner 4' and the coupler 5'. In FIG. 9, units denoted by the same reference characters are the same as or similar to those described above when not specifically mentioned.

The pumping source 3-3 generates a pumping light beam (for example, at the same wavelength 1440 nm as the pumping source 3-1) at the shorter wavelength. The pumping source 3-4 generates a pumping light beam (for example, at the same wavelength 1480 nm as the pumping source 3-2) at the longer wavelength. The combiner (a polarized wave combiner or a wavelength combiner) 4' combines the pumping light beams generated by the pumping sources 3-3 and 3-4. The coupler 5' couples an output of the combiner 4', which is the pumping light beams from the pumping sources 3-3 and 3-3, with a main signal light beam to be transmitted to the Raman fiber 1.

This Raman amplification repeater comprises a plurality of counterpropagating pumping sources 3-1 and 3-2 generating pumping light beams at different wavelengths (1440 nm and 1480 nm), a plurality of copropragting pumping sources 3-3 and 3-4 generating pumping light beams at different wavelengths (1440 nm and 1480 nm), a Raman fiber 1 receiving the pumping light beams from the counterpropagating pumping sources 3-1 and 3-2 from one direction (from front), receiving pumping light beams from the copropragting pumping sources 3-3 and 3-4 from the other direction (from back) to amplify the main signal light beam by taking advantages of the stimulated Raman scattering phenomenon with the pumping light beams from the both directions, and an EDF 2 receiving the main signal light beam amplified by the Raman fiber to further amplify it.

In this Raman amplification repeater, the pumping light beam (1440 nm and 1480 nm) from the both directions, from the front stage (from front) and the rear stage (from back), of the Raman fiber 1 are inputted to the Raman fiber 1. In this case, a part of the pumping light beam (1480 nm) at the longer wavelength is reflected by the reflection-type fiber grating 6 and introduced as a pumping light beam for the EDF 6 to the EDF 2 in the rear stage of the Raman fiber 1, as well as that shown in FIG. 1. On the other hand, the pumping light beams (1440 nm and 1480 nm) inputted from front of the Raman fiber 1 is transmitted through the Raman fiber 1 and the reflection-type fiber grating 6, and introduced as pumping light beams for the EDF 2 to the EDF 2.

The coupler 5', the circulator 5 and the reflection-type fiber grating 6 function as a pumping light introducing means which introduces a part of the pumping light beam at the longer wavelength (1480 nm) of the pumping light beams (1440 nm and 1480 nm) from the counterpropagating pumping sources 3-1 and 3-2 as a pumping light beam for the EDF 2 into the EDF 2, and transmits the pumping light beams from the copropagating pumping sources 3-3 and 3-4 as pumping light beams for the EDF 2.

In this case, it is possible to largely improve the pumping efficiency of the Raman amplification as compared with the case of only counterpropagating pumping. Besides, it is possible to largely improve the pumping efficiency of the EDF 2 because the main signal light beam is pumped by the EDF 2 with a total pumping light power of the pumping light beams (1440 nm and 1480 nm) from front and the pumping light beam (reflected light: 1480 nm) at the longer wavelength from back.

In the bidirectional pumping structure described above, it is possible to realize the equivalent function with the hybrid coupler 11 described above with reference to FIGS. 4 and 6 instead of the circulator 5 and the reflection-type fiber grating 6. It is also possible to apply this structure to the bidirectional optical communication over the up link and the down link, as described above with reference to FIGS. 3, 7 and 8.

In the above-described example, the copropagating pumping sources 3-3 and 3-4, which generate pumping light beams, are of the same number and at the same wavelengths as the counterpropagating pumping sources 3-1 and 3-2. However, the number of the copropagating pumping sources may differ from that of the counterpropagating pumping sources (the number of the copropagating pumping sources may be one) so long as at least a pumping light beam at the same wavelength as the pumping light beam at the wavelength used as the pumping light for the EDF 2 is contained. In which case, the other wavelengths maybe different.

(D) Others

The present invention is not limited to the above examples, but may be modified in various ways without departing from the scope of the invention.

For example, a part of the pumping light beam at the shorter wavelength may be reflected or split, and introduced to the EDF when the power of the pumping source at the shorter wavelength has allowance.

In each of the above-described embodiments, a part of the pumping light beam at the longer wavelength (or at the shorter wavelength) is reflected or split in the rear stage of the Raman fiber 1, and introduced to the EDF 2. Alternatively, it is possible to reflect (that is, the reflectance=100%) all the pumping light beam (a pumping light beam having sufficient allowance in at least optical power) in the front stage of the Raman fiber 1, or couple it to the main signal light beam to be transmitted the Raman fiber 1.

In the above-described embodiments, the number of wavelengths of the counterpropagating pumping light beams is two. Alternatively, the number of the wavelengths may be three or more, of course. In which case, the number of wavelengths (specific wavelengths) to be reflected or split and introduced to the EDF 2 may be two wavelengths or more at the longer wavelength.

What is claimed is:

1. An optical amplifying apparatus comprising:
   a plurality of pumping sources generating pumping light beams at different wavelengths;
   a Raman amplification medium receiving the pumping light beams from said pumping sources to amplify a main signal light beam by using stimulated Raman scattering phenomenon due to said pumping light beams;

a rare-earth-doped optical amplification medium receiving said main signal light beam amplified by said Raman amplification medium to further amplify said main signal light beam; and a pumping light introducing means introducing a part or all of a pumping light beam at a specific wavelength of said pumping light beams as a pumping light beam for said rare-earth-doped optical amplification medium to said rare-earth-doped optical amplification medium, wherein said plurality of pumping sources comprises a plurality of counterpropagating pumping sources generating counterpropagating pumping light beams at different wavelengths, and a copropagating pumping source generating a copropagating pumping light beam at a specific wavelength identical to at least one of said wavelengths of said counterpropagating pumping light beams generated by said counterpropagating pumping sources, said Raman amplification medium receives said counterpropagating pumping light beams from said counterpropagating pumping sources from one direction and receives said copropagating pumping light beam from said copropagating pumping source from another direction to amplify the main signal light beam by using stimulated Raman scattering phenomenon due to said pumping light beams from said one and said another directions, and said pumping light introducing means introduces a part or all of said counterpropagating pumping light beam at said specific wavelength of said counterpropagating pumping light beams from said counterpropagating pumping sources as a pumping light beam for said rare-earth-doped optical amplification medium to said rare-earth-doped optical amplification medium, and transmits at least said copropagating pumping light beam at said specific wavelength from said copropagating pumping source as another pumping light beam for said rare-earth-doped optical amplification medium to said rare-earth-doped optical amplification medium.

2. The optical amplifying apparatus according to claim 1, wherein said pumping light introducing means comprises a reflective fiber grating disposed between said Raman amplification medium and said rare-earth-doped optical amplification medium, and the reflective fiber grating reflects a part of said counterpropagating pumping light beam at said specific wavelength to said rare-earth-doped optical amplification medium, transmits the rest of said counterpropagating pumping light beam to said Raman amplification medium, and transmits said copropagating pumping light beam from said copropagating pumping source to said rare-earth-doped optical amplification medium.

3. The optical amplifying apparatus according to claim 1, wherein said pumping light introducing means comprises an optical coupler disposed between said Raman amplification medium and said rare-earth-doped optical amplification medium, said optical coupler splits said counterpropagating pumping light beam at said specific wavelength, introduces a part of said counterpropagating pumping light beam at said specific wavelength to said rare-earth-doped optical amplification medium, introduces the rest of said counterpropagating pumping light to said Raman amplification medium, and transmits said copropagating pumping light beam from said copropagating pumping source to said rare-earth-doped optical amplification medium.

4. The optical amplifying apparatus according to claim 1, wherein said pumping light introducing means introduces a pumping light beam at a longer wavelength as one of said counterpropagating and copropagating pumping light beams at said specific wavelength to said rare-earth-doped optical amplification medium.

5. The optical amplifying apparatus according to claim 2, wherein said pumping light introducing means introduces a pumping light beam at a longer wavelength as one of said counterpropagating and copropagating pumping light beams at said specific wavelength to said rare-earth-doped optical amplification medium.

6. The optical amplifying apparatus according to claim 3, wherein said pumping light introducing means introduces a pumping light beam at a longer wavelength as one of said counterpropagating and copropagating pumping light beams at said specific wavelength to said rare-earth-doped optical amplification medium.

7. The optical amplifying apparatus according to claim 1, wherein said pumping sources intensity-modulate said pumping light beams according to monitoring control information to be transmitted.

8. The optical amplifying apparatus according to claim 2, wherein said pumping sources intensity-modulate said pumping light beams according to monitoring control information to be transmitted.

9. An optical amplifying apparatus according to claim 3, wherein said pumping sources intensity-modulate said pumping light beams according to monitoring control information to be transmitted.

10. The optical amplifying apparatus according to claim 4, wherein said pumping sources intensity-modulate said pumping light beams according to monitoring control information to be transmitted.

11. The optical amplifying apparatus according to claim 5, wherein said pumping sources intensity-modulate said pumping light beams according to monitoring control information to be transmitted.

12. The optical amplifying apparatus according to claim 6, wherein said pumping sources intensity-modulate said pumping light beams according to monitoring control information to be transmitted.

13. An apparatus comprising:

a Raman amplification medium through which a signal light travels;

a rare-earth-doped optical amplification medium through which the signal light travels after traveling through the Raman amplification medium; and a fiber grating positioned between the Raman amplification medium and the rare-earth-doped optical amplification medium, wherein a first pump light which includes pump light at a specific wavelength is provided to the Raman amplification medium so that the first pump light copropagates through the Raman amplification medium with the signal light and is thereafter transmitted through the fiber grating to then copropagate through the rare-earth-doped optical amplification medium with the signal light, a second pump light which includes pump light at a plurality of wavelengths including the specific wavelength is provided to the fiber grating so that the second pump light at wavelengths other than the specific wavelength is transmitted through the fiber grating to the Raman amplification medium and then counterpropagates through the Raman amplification medium as the signal light travels through the Raman amplification medium, the fiber grating reflects the second pump light at the specific wavelength provided to the fiber grating so that the reflected second pump light copropagates through the rare-earth-doped optical amplification medium with the signal light, the apparatus thereby causing the signal light to be Raman amplified as the signal light travels through the Raman amplification medium in accordance with the first pump light provided to the Raman amplification medium and the second pump light transmitted to the Raman amplification medium by the fiber grating, and the apparatus thereby causing the signal light to be amplified as the signal light travels through the rare-earth-doped optical amplification medium in accordance with the first pump light transmitted to the rare-earth-doped optical amplification medium through the fiber grating and the second pump light reflected by the fiber grating.

14. An apparatus comprising:

a Raman amplification medium through which a signal light travels;

a rare-earth-doped optical amplification medium through which the signal light travels after traveling through the Raman amplification medium; and an optical coupler positioned between the Raman amplification medium and the rare-earth-doped optical amplification medium, wherein a first pump light which includes pump light at a specific wavelength is provided to the Raman amplification medium so that the first pump light copropagates through the Raman amplification medium with the signal light and is thereafter introduced by the optical coupler to the rare-earth-doped optical amplification medium to then copropagate through the rare-earth-doped optical amplification medium with the signal light, a second pump light which includes pump light at a plurality of wavelengths including the specific wavelength is provided to the optical coupler so that the second pump light at wavelengths other than the specific wavelength is introduced by the optical coupler to the Raman amplification medium to then counterpropagate through the Raman amplification medium as the signal light travels through the Raman amplification medium, the optical coupler causes the second pump light at the specific wavelength provided to the optical coupler to be introduced to the rare-earth-doped optical amplification medium so that the introduced second pump light copropagates through the rare-earth-doped optical amplification medium with the signal light, the apparatus thereby causing the signal light to be Raman amplified as the signal light travels through the Raman amplification medium in accordance with the first pump light provided to the Raman amplification medium and the second pump light introduced to the Raman amplification medium by the optical coupler, and the apparatus thereby causing the signal light to be amplified as the signal light travels through the rare-earth-doped optical amplification medium in accordance with the first pump light introduced to the rare-earth-doped optical amplification medium by the optical coupler and the second pump light introduced to the rare-earth-doped optical amplification medium by the optical coupler.

* * * * *

UNITED STATES PATENT AND TRADEMARK OFFICE
CERTIFICATE OF CORRECTION

PATENT NO. : 7,079,313 B2
APPLICATION NO. : 10/698472
DATED : July 18, 2006
INVENTOR(S) : Hiroshi Ogiwara et al.

It is certified that error appears in the above-identified patent and that said Letters Patent is hereby corrected as shown below:

Title Page
(56) References Cited

Col. 2, line 1, after "6,549,329" delete "B1" and insert --B2-- therefor.
Col. 2, line 2, after "6,563,629" delete "B1" and insert --B2-- therefor.
Col. 2, line 4, after "6,631,025" delete "B1" and insert --B2-- therefor.
Col. 2, line 5, after "6,731,426" delete "B1" and insert --B2-- therefor.

OTHER PUBLICATIONS
Col. 2, line 1, Delete "Understandign Fiebr" and insert --Understanding Fiber--, therefor.

Signed and Sealed this

Twenty-sixth Day of December, 2006

JON W. DUDAS
*Director of the United States Patent and Trademark Office*